(12) United States Patent
Bessette

(10) Patent No.: US 12,370,719 B2
(45) Date of Patent: Jul. 29, 2025

(54) SYSTEM AND METHOD FOR PRODUCING LOAD-BEARING HEMP SHIV CONCRETE BLOCKS

(71) Applicant: Ronald F. Bessette, Davenport, FL (US)

(72) Inventor: Ronald F. Bessette, Davenport, FL (US)

(*) Notice: Subject to any disclaimer, the term of this patent is extended or adjusted under 35 U.S.C. 154(b) by 0 days.

(21) Appl. No.: 18/924,238

(22) Filed: Oct. 23, 2024

(65) Prior Publication Data

US 2025/0042056 A1    Feb. 6, 2025

Related U.S. Application Data

(63) Continuation-in-part of application No. 17/942,849, filed on Sep. 12, 2022, now abandoned.

(51) Int. Cl.
| | |
|---|---|
| *B32B 1/00* | (2024.01) |
| *B28B 1/00* | (2006.01) |
| *B28B 1/52* | (2006.01) |
| *B28B 3/02* | (2006.01) |
| *B28B 11/04* | (2006.01) |
| *B28B 11/24* | (2006.01) |
| *E04B 2/08* | (2006.01) |
| *E04B 2/02* | (2006.01) |

(52) U.S. Cl.
CPC .............. *B28B 1/008* (2013.01); *B28B 1/525* (2013.01); *B28B 3/02* (2013.01); *B28B 11/044* (2013.01); *B28B 11/24* (2013.01); *E04B 2/08* (2013.01); *E04B 2002/0286* (2013.01)

(58) Field of Classification Search
None
See application file for complete search history.

(56) References Cited

U.S. PATENT DOCUMENTS

| | | | |
|---|---|---|---|
| 4,185,066 A * | 1/1980 | Temple ................ | C04B 41/502 423/544 |
| 2010/0136269 A1* | 6/2010 | Andersen ............. | B28B 11/003 428/34.4 |
| 2012/0110945 A1* | 5/2012 | Hoang ................ | C04B 20/0064 52/596 |
| 2021/0101832 A1* | 4/2021 | Rademan ............ | C04B 40/0231 |

* cited by examiner

Primary Examiner — Mohammad M Ameen
(74) Attorney, Agent, or Firm — The Rapacke Law Group, P.A.; Andrew Rapacke

(57) ABSTRACT

This application relates to a method of manufacturing a load-bearing hemp shiv concrete blocks using magnesium-based cement, the method including: measuring proportional parts of ingredients: a hemp shiv in 70-75% proportion by volume; a Magnesium Oxychloride Cement (MOC) in 20-25% proportion by volume; and water in 5-10% proportion by volume. The method includes depositing the measured ingredients in a mixer and mixing for a time period appropriate to the conditions to produce a slurry, wherein the time period is between ten minutes and thirty minutes; removing the slurry from the mixer; depositing the slurry into one or more molds comprising a frame with a lockable lid and a removable base; pressing, via a press, the slurry in the molds to a suitable level; allowing the pressed slurry to set and cure within the sealed molds to produce one or more load-bearing fiber based concrete blocks; removing the one or more load-bearing hemp shiv concrete blocks from the one or more molds by removing the lid of the molds.

3 Claims, 4 Drawing Sheets

SYSTEM AND METHOD FOR PRODUCING LOAD-BEARING HEMP SHIV CONCRETE BLOCKS

CROSS-REFERENCE TO RELATE APPLICATIONS

This application is Continuation-in-Part of Non-Provisional patent application Ser. No. 17/942,849 filed on Sep. 12, 2022 entitled "SYSTEM AND METHOD FOR PRODUCING A SOLID, LOAD-BEARING, FIBER CEMENT BUILDING BLOCK" incorporated by reference herein.

TECHNICAL FIELD

The embodiments generally relate to building materials and more particularly to load-bearing fiber-based building blocks and more particularly to production of load-bearing hemp shiv concrete blocks utilizing magnesium-based cement.

BACKGROUND

Conventional systems for fabricating cement building blocks are created by pressing a cement block to the required density and then the block is immediately removed from the mold and left to cure on a flat surface. The block's eventual strength is dependent on the binder and the compression used in its manufacturing.

For a fiber/cement-based load-bearing blocks the ratio of fiber to binder block may be high and thus need to cure within the mold to maintain their shape as they cure. To date no system uses this method except the one disclosed in the present invention. If the fiber content and the compression is too high the block will expand after it is compressed if not restricted by the confines of the mold. If they are left to cure outside the mold, they will lack dimensional accuracy and compression strength. This potential weakness is because of the time it takes to cure. During that time there will be the potential of either, the weight of the material will cause it to slump or the increased ratio of fiber to binder will cause the block to expand.

Traditional construction materials often rely on non-renewable resources and processes that can harm the environment. There is an increasing demand for sustainable construction materials that not only reduce environmental impact but also enhance building efficiency and maintain structural integrity. Traditional concrete blocks typically do not offer additional functional benefits such as insulation or moisture management.

Accordingly, a method and system for production of load-bearing hemp shiv concrete blocks utilizing magnesium-based cement are desired.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments described herein provide This invention provides innovative formulations for manufacturing load-bearing hemp shiv concrete blocks using magnesium oxychloride and magnesium phosphate cements. These blocks are designed to be environmentally friendly, cost-effective, and structurally competent for load-bearing applications. Additionally, the blocks possess enhanced characteristics including insulating properties, moisture management, mold and mildew resistance, rot-proofing, fire resistance, bulletproof qualities, breathability, and thermal mass. These properties make the blocks particularly suited for eco-friendly building projects that require high-performance materials.

A critical feature of the manufacturing process involves the use of six-sided molds with lockable and removable top and bottom sides, ensuring dimensional accuracy and maintaining the compression strength of the cured blocks. The design of the molds prevents any loss of compression strength during curing. Once cured, the molds are returned to the press with the tops removed and the molds reversed, allowing the blocks to be pressed out directly onto a pallet for easy storage and transport. This feature significantly enhances the efficiency of the production process and ensures the structural integrity of each block.

In one embodiment, a method of manufacturing a load-bearing hemp shiv concrete blocks using magnesium-based cement is provided. The method includes: measuring proportional parts of ingredients including: a hemp shiv in 70-75% proportion by volume; a Magnesium Oxychloride Cement (MOC) in 20-25% proportion by volume; and water in 5-10% proportion by volume. The method further includes: depositing the measured ingredients in a mixer and mixing for a time period appropriate to the conditions to produce a slurry, wherein the time period is between ten minutes and thirty minutes; removing the slurry from the mixer; depositing the slurry into one or more molds comprising a frame with a lockable lid and a removable base; pressing, via a press, the slurry in the molds to a suitable level; allowing the pressed slurry to set and cure within the sealed molds to produce one or more load-bearing fiber based concrete blocks; removing the one or more load-bearing hemp shiv concrete blocks from the one or more molds by removing the lid of the molds, wherein removing the one or more load-bearing hemp shiv concrete blocks from the one or more molds further refers to reversing the frame 180 degrees and, then, reinserting the mold into the press to allow for the load-bearing hemp shiv concrete blocks to be ejected from the mold onto a pallet.

The embodiments can be designed with hollowed out cavities such as found in a concrete forming system, allowing for the cement mortar to be poured into the cavities to create the post and beam system.

What is needed is an apparatus and method that allows the block manufacturing procedure to be performed wherein the fiber-based hemp shiv load-bearing concrete blocks can be formed without the need for a post and beam system that encompasses a wood frame or concrete mortar nor the need for steel rebar reinforcement to qualify it as load-bearing.

The present techniques described herein address several problems owing to the elimination: of the extra expense in manufacturing a block designed as a concrete forming system, the extra costs of materials and labor to add the post and beam system during construction, the need to use concrete mortar and steel increases the carbon footprint of the building, and the use of wood frame materials, concrete and steel reinforcement, which are not sustainable long term.

The disclosed fiber-based load-bearing blocks and procedure for their manufacture offer the use of eco-ingredients, a bio-compatible binder such as Magnesium Oxychloride cement (MOC), and an innovative method of manufacturing, mixing, and block compression utilizing the claimed mold design and curing process allowing for the formation of blocks that can be pressed to any level needed to meet the load-bearing requirements of all construction uses that can be assured of proper strengths and dimensionally accurate results on a consistent basis.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
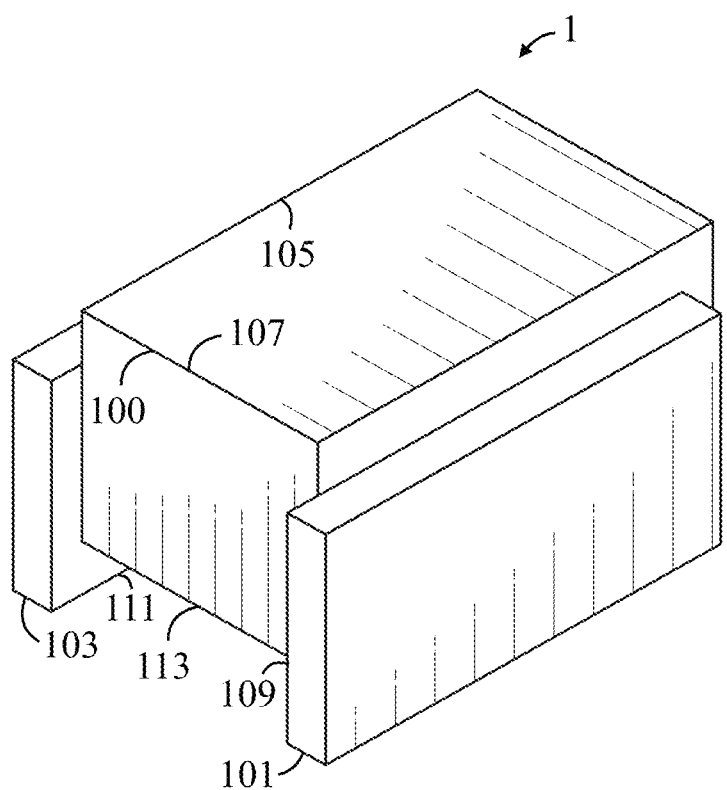
FIG. 1 illustrates a perspective view of the load-bearing fiber cement building block, according to some embodiments.

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used to distinguish one entity or element from another entity or element without necessarily requiring or implying any physical or logical relationship, or order between such entities or elements.

Figure 3:
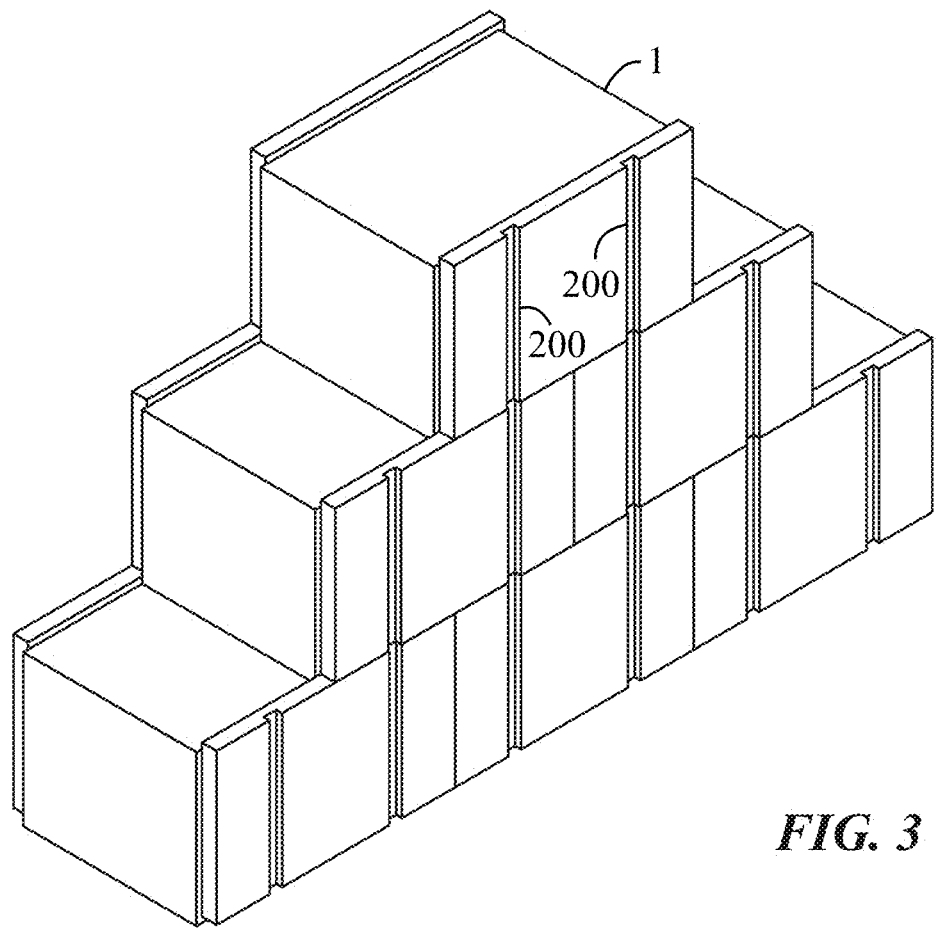
FIG. 3 illustrates a perspective view of a plurality of load-bearing fiber cement building blocks joined together, according to some embodiments.

FIG. 1 depicts a three-quarter perspective view of an individual load-bearing fiber-cement concrete building block 1 illustrating the main rectangular body 100, and the integral mating legs 101 and 103 of the main rectangular body 100. The mating legs are identical in dimensions; the right protrusion, or leg, is labeled 101, and the left protrusion, or mating leg, is labeled 103, for purposes of clarity and convenience. Their role is to provide a mating surface and method for interlocking adjacent blocks. The described labeling of "101" and "103" is completely interchangeable and is used strictly for purposes of clarity. The rigid main body 100 includes a top 105 including a center 107. The rigid main body 100 is formed by a molding and pressing method (see FIG. 5 and description herein). A pair of protrusions 109, 111 are located on the underside 113 of the main rectangular body 100 to provide a first mating surface and a second mating surface for attaching to an adjoining fiber cement block (as shown in FIG. 3).

In some embodiments, FIG. 1 illustrates a load-bearing fiber cement building block 1 which is not interlocked with an adjoining block. Rather, the load-bearing fiber cement building block forms a sliding engagement with the adjoining block.

In some embodiments, the load-bearing fiber cement building block may be stacked on top of one another and joined together with or without a joining compound. Joining methods include but are not limited to cement mortar, thin set cement mortar, adhesive, MgO based mortar, lime or local traditional binder.

Figure 2:
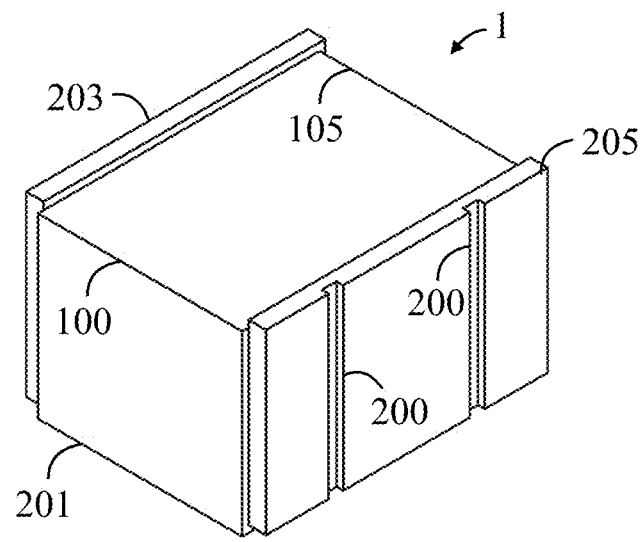
FIG. 2 illustrates a perspective view of the load-bearing fiber cement building block including utility channels, according to some embodiments.

FIG. 2 illustrates a perspective view of a load-bearing fiber cement building block 1 having channels 200 to accommodate electrical wiring, plumbing or other materials related to utilities, and to help lock in exterior stucco and interior plaster for stronger adhesion results.

Figure 4:
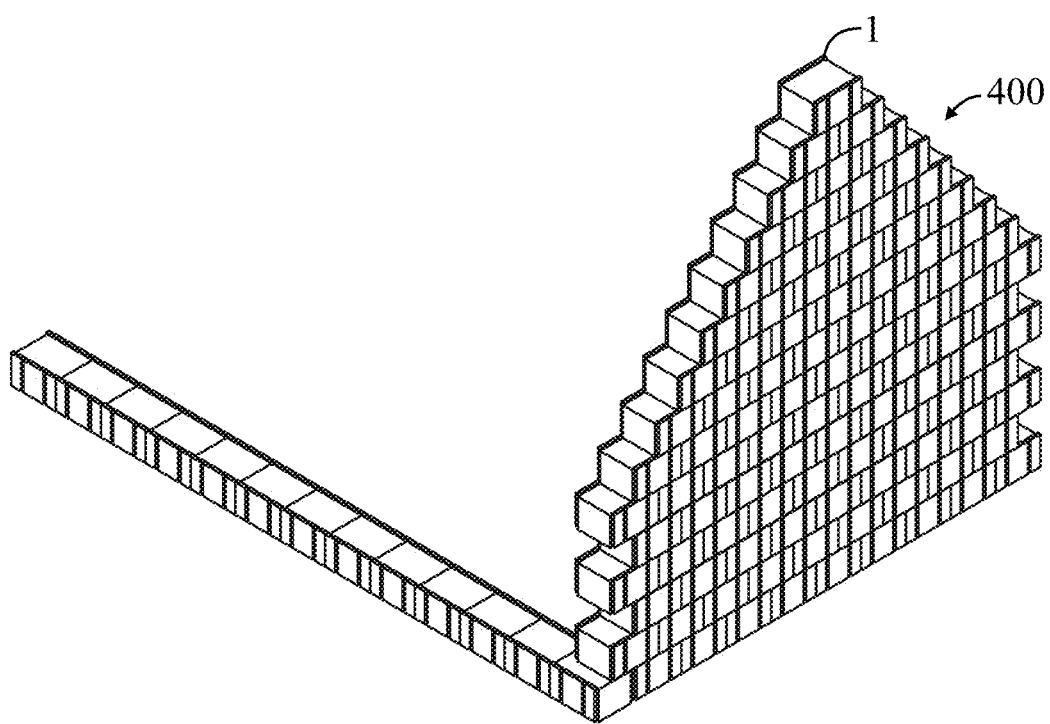
FIG. 4 illustrates a perspective view of a partial structure constructed using the load-bearing fiber cement building blocks, according to some embodiments.

FIG. 3 illustrates a perspective view of a plurality of load-bearing fiber cement building blocks 1 stacked vertically atop one another. FIG. 4 illustrates a structure 400 wherein the load-bearing fiber cement building blocks 1 are configured as shown in FIG. 3, or in another suitable method of joining, stacking, and/or interlocking the load-bearing fiber cement building blocks 1. Interlocking the load-bearing fiber cement building blocks may form a unified, contiguous, and/or monolithic structure.

Figure 5:
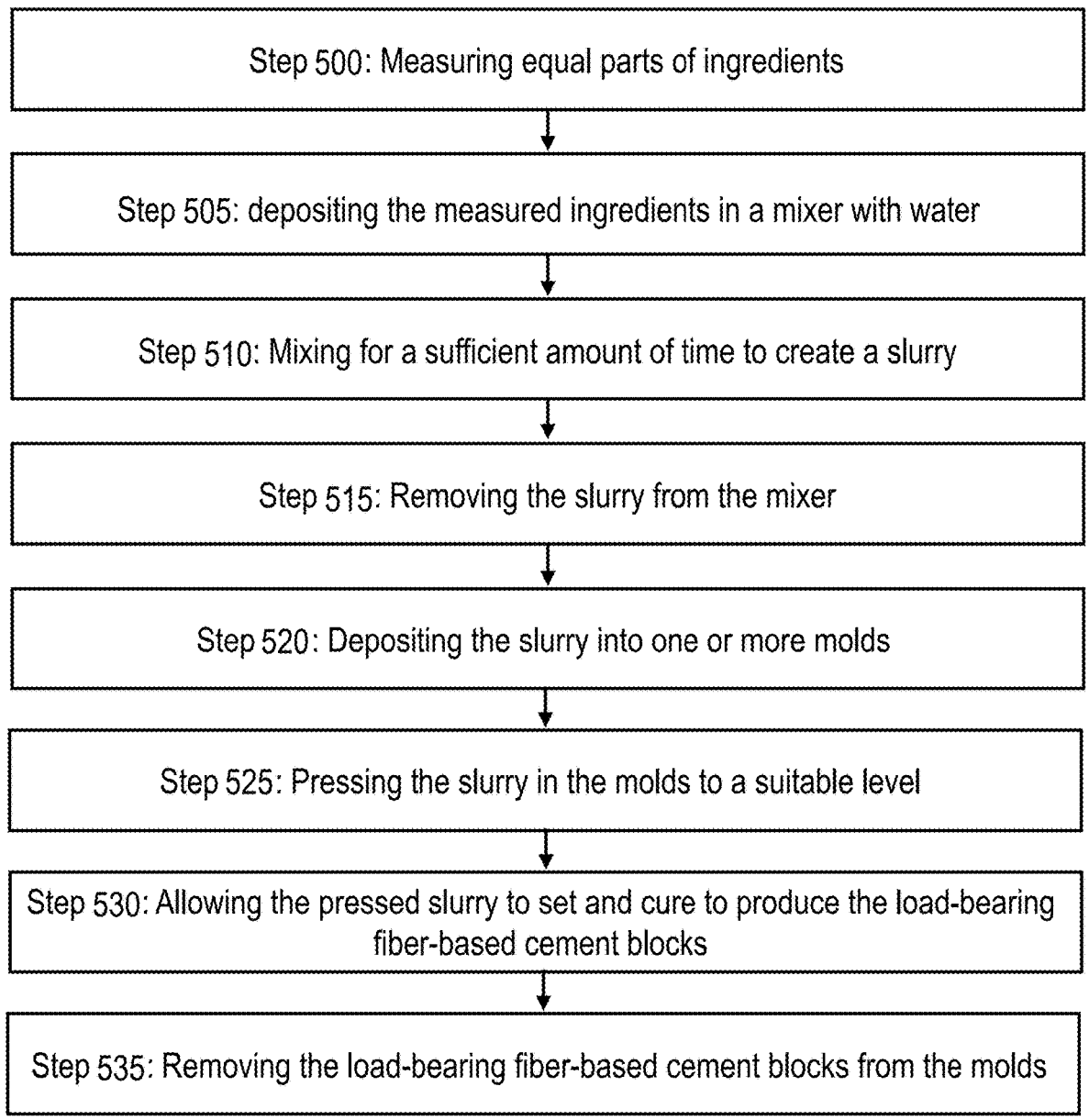
FIG. 5 illustrates a flowchart of a method for manufacturing a load-bearing fiber cement building block, according to some embodiments.

FIG. 5 illustrates a flowchart of a method for manufacturing a load-bearing fiber cement building block. In step 500, ingredients including a fiber material, Magnesium Oxide cement powder, and Magnesium chloride are measured. In step 505, the measured ingredients are deposited in a mixer with a sufficient amount of water. In step 510, the measured ingredients and sufficient amount of water are mixed to produce a slurry. In step 515, the slurry is removed from the mixer and in step 520 the slurry is deposited into molds. In step 525, the slurry is pressed in the molds to a suitable level. Note that the molds are designed to limit the press to the required dimension of the finished block. In step 530, the pressed slurry is allowed to set and cure to produce the load-bearing fiber-based concrete blocks. Additionally, the mold lid may be secured and locked in place. In step 535, the load-bearing fiber-based concrete blocks are removed from the molds.

In some embodiments, the slurry is allowed to set and cure for about between 2-hours and 16-hours. This length of time may depend on temperature, humidity, quality of the binding agents, size of the load-bearing fiber cement block, etc.

In some embodiments, the amount of water is based on the required density of the slurry and the concentration of the MgCl solution used as a catalyst is determined by trial and error and once established it is adhered to for ongoing production.

In some embodiments, the load-bearing fiber cement block is composed of appropriate parts of fibrous content, a binding agent, and a suitable amount of water. The binding agent includes measured amounts of the following: Magnesium Chloride, and Magnesia cement powder and water The claimed invention described herein is composed of industrial hemp shiv, which offers several improvements over commonly available building blocks including, but not limited to: lighter-weight, improved moisture absorbent propertied, improved insulating properties, improved specific strength while offering lower density, improved flexibility, and impact resistance.

The claimed invention has numerous innovative biodegradable design provisions, including the use of a unique set of components contained in the described Magnesium Oxychloride cement, which offers properties such as: a biocompatible property which binds strongly to a natural fiber, which offers faster setting and hardening; has weak alkaline and low corrosive properties; creates a fireproof material; is non-toxic; has lower thermal conductivity; has higher transverse and crushing strengths making it suitable in seismic areas; and in addition, has insecticidal properties, and is unaffected by oil, grease and paints.

The manufacturing process described herein attempts to address several shortcomings in presently existing methods present in the manufacture of traditional cement blocks, which are overcome with the described invention. The limitations of existent methodologies are more specifically directed to addressing present normative methods.

Present required and accepted methodologies are limited to the setting qualities and limitations of claimed compositions which are ultimately limited by several manufacturing factors, since heat quickens the setting process, a cooler environment is best suited for producing magnesium cement-based blocks.

The manufacturing process described herein addresses several shortcomings in presently existing methods contained in the manufacture of traditional cement blocks, which are overcome with the compositions which are further combined by methods for unifying said components in a proscribed fashion in the present invention. These items of manufacture are more specifically directed to addressing limitations by presently extant limitations, which are requiring of fast setting qualities and of limitations incurred by the heat intensifying setting process, thus requiring that a cool environment is best for producing magnesium cement. A controlled temperature environment is necessary for obtaining consistent results.

The volume of water utilized in every bath in conjunction with the indoor humidity levels will affect the resultant mixture. A controlled humidity environment is further necessary, and recommended, in order to obtain repeatedly consistent results.

The aggressive nature of the magnesium binder is such that a special non-stick treatment should be employed to the surface of the equipment it comes into contact with, the molds, the dispensing equipment and the interior of the mixers. An industrial coating of Teflon or the like will be utilized.

The mixing system is affected by the type of mixer, wherein the mixing cycle is further defined by the duration, the loading method, and the energy of materials contained in the mixing process. There are two types of mixers that are suitable for combining a fiber-cement as described in the present invention and they are pan and ribbon mixers. Pan type mixers consist of a cylindrical pan (fixed or rotating) contains the slurry to be mixed, while one or two sets of blades rotate inside the pan to mix the materials and a blade scrapes the wall of the pan. The shapes of the blades and the axes of rotation vary.

The mixing process is efficient such that the concrete mixture is collected through a central hole provided in the pan. The rotating star blades contain special blades called "scrapper blades" which will prevent the cement slurry from sticking to the pan. The blades can also be adjusted in height thus preventing no room for the cement mixture to accumulate in the pan.

Once the mix is completely combined it is removed from the mixer and put in a separate distribution system. The distributor fills each mold with an equal and correct amount of mixture.

A compression system to accommodate easy expansion of operations. Said compression system offers the means to press several blocks at a time, wherein a rack of several blocks can slip in and out of it for reducing production time.

The molds utilized in this invention are comprised of cast aluminum or composite material and are fashioned to allow the utilization of a variety of design features, such as, but not limited to: interlocking features, channels for accommodating electrical, and plumbing and heating/cooling systems.

The molds contain removable locking lids so that any expansion of the fibers during the curing process is entirely contained and the dimension of the resultant block is controlled and dimensionally accurate once removed from the mold.

Once the blocks are cured, the lid is removed and the frame in which the block molds are held is reversed 180 degrees and then re-inserted into the press. The press thus further acts against the removable bottom plate in a reverse fashion allowing for the blocks to be ejected from the molds onto a pallet for storage.

There is considerable heat generated from the chemical reaction created by the ingredient mix and the steam that may be seen coming off the molds. This will happen dependent on the room temperature and humidity, wherein. Without a controlled environment, during summer seasons there will appear a very quick setting of the blocks and during winter seasons there will appear a slower setting time. It remains to be important parameter to control the temperature and humidity all year long throughout.

In one embodiment, the Component Formulations used in production of Cement-Based Hemp Shiv Block is as follows. The Magnesium Oxychloride Cement-Based Hemp Shiv Block consists of:

Hemp Shiv:
Proportion 70-75% by volume. The function of the Hemp Shiv is as a primary aggregate, providing bulk, lightweight properties, and thermal insulation.

Magnesium Oxychloride Cement (MOC):
Proportion 20-25% by volume. The function of MOC is to serve as a binding agent for structural integrity and strength. Composed of magnesium oxide (MgO) and magnesium chloride ($MgCl_2$), with a MgO to $MgCl_2$ ratio of approximately 3:1 to 5:1.

Additives:
Water: 5-10% by volume, required for the chemical activation of the cement. Epsom Salts (Magnesium Sulfate: 0.5-2% of the total volume, used to enhance the physical properties.

Waterproofing Additives 0.5-2% of the cement mix, to increase water resistance and durability.

In one embodiment, Magnesium Phosphate Cement-Based Hemp Shiv Block is provided as follows:

Hemp Shiv
  Proportion: 70-75% by volume

The Hemp Shiv acts as the primary aggregate, providing bulk, lightweight properties, and thermal insulation.

Magnesium Phosphate Cement (MPC)
  Proportion: 20-25% by volume
  Provides structural integrity and strength.

A mixture of magnesium oxide (MgO) and magnesium potassium phosphate (MKP), with a MgO to phosphate ratio of 3:1 to 5:1.

Additives:

Water: 5-10% by volume, necessary for the cement reaction.

Epsom Salts (Magnesium Sulfate): Typically, 0.5-2% of the total mixture volume, enhances durability.

Waterproofing Additives: 0.5-2% by volume of the cement mix, improves water resistance.

In one embodiment, the block Manufacturing Process is provided as follows. Both formulations are mixed and molded under specific conditions, utilizing a compression force of 20 tons to achieve the required density. The six-sided, lockable molds ensure that the blocks are cured without deformation, maintaining their structural integrity and dimensional precision. Post-curing, the blocks are mechanically ejected onto pallets for efficient handling and distribution.

Many different embodiments have been disclosed herein, in connection with the above description and the drawings. It will be understood that it would be unduly repetitious and obfuscating to describe and illustrate every combination and sub-combination of these embodiments. Accordingly, all embodiments can be combined in any way and/or combination, and the present specification, including the drawings, shall be construed to constitute a complete written description of all combinations and sub-combinations of the embodiments described herein, and of the manner and process of making and using them, and shall support claims to any such combination or sub-combination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a sub-combination or variation of a sub-combination.

It will be appreciated by persons skilled in the art that the present embodiment is not limited to what has been particularly shown and described herein above. A variety of modifications and variations are possible in light of the above teachings without departing from the following claims.

What is claimed is:

1. A load-bearing hemp shiv concrete block based on magnesium-based cement, comprising:
    a hemp shiv in 70-75% proportion by volume;
    a Magnesium Oxychloride Cement (MOC) in 20-25% proportion by volume; and
    water in 5-10% proportion by volume,
    wherein the hemp shiv is pre-treated to remove lignin and dust particles prior to incorporation,
    wherein the MOC comprises magnesium oxide (MgO) and magnesium chloride (MgCb), with a MgO to MgCb ratio is within a range of to 5:1, and wherein the block is cast in a multi-layered mold with vibration compaction to increase density and compressive strength.

2. The load-bearing hemp shiv concrete block based on magnesium-based cement of claim 1, further comprising:
    Magnesium Phosphate Cement (MPC) in 20-25% proportion by volume for providing structural integrity and strength; and
    Epsom Salts (Magnesium Sulfate) in a proportion of 0.5-2% of the total volume, used to enhance the physical properties,
    wherein MPC and MOC are blended in a dual-phase hydration reaction that enhances microstructural bonding and thermal resistance.

3. The load-bearing hemp shiv concrete block based on magnesium-based cement of claim 1, further comprising:
    waterproofing additives in a proportion of 0.5-2% of the cement mix, to increase water resistance and durability wherein said waterproofing additives include a silane-siloxane emulsion or crystalline admixture that chemically integrates into the cement matrix to form internal water-repelling barriers.

* * * * *